Feb. 26, 1957 W. E. WOLFE 2,782,760
AUTOMATIC POULTRY FEED AND WATER DISPENSER
Filed Jan. 13, 1955 3 Sheets-Sheet 1
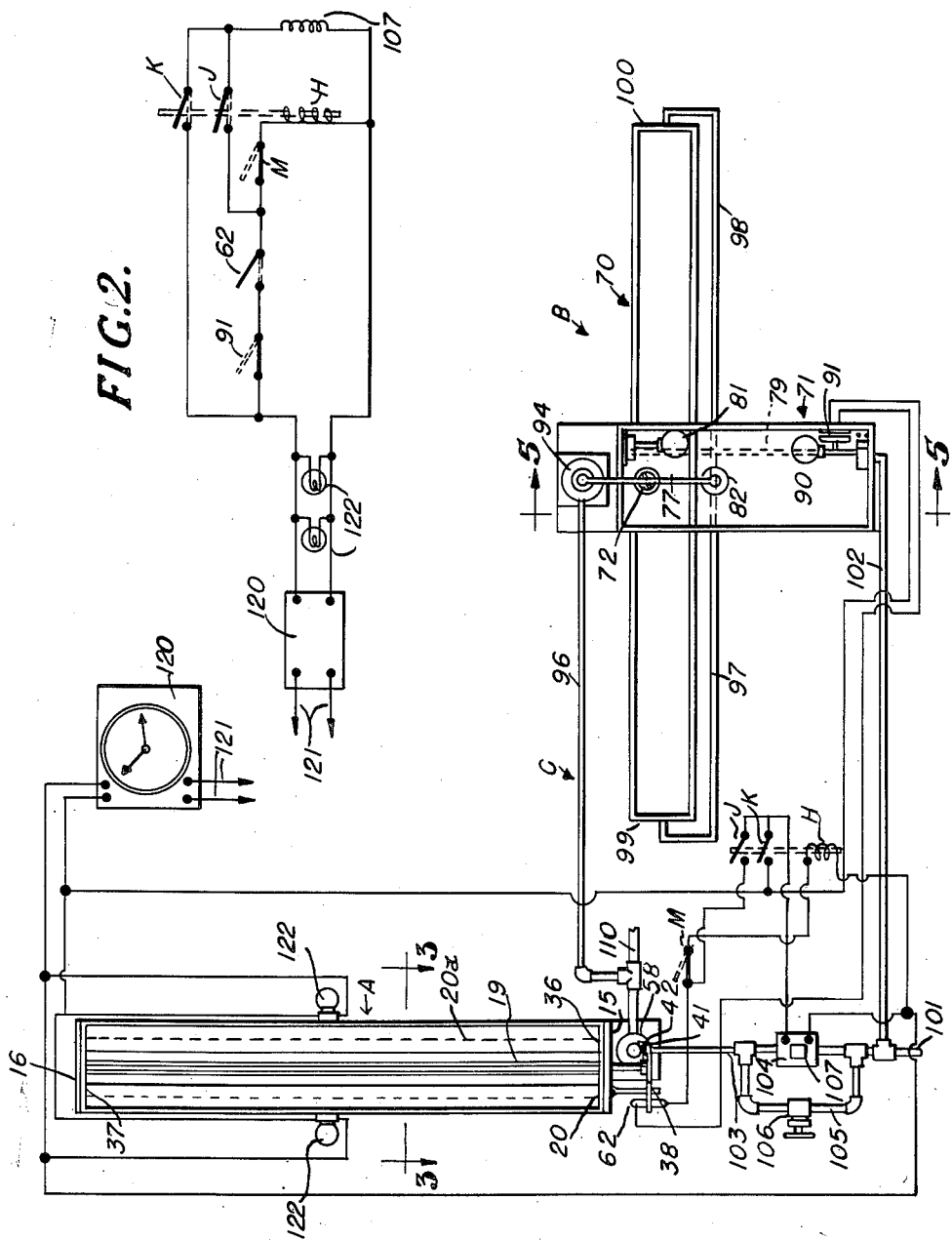
INVENTOR
WILLIAM E. WOLFE
BY
Cushman, Darby & Cushman
ATTORNEY

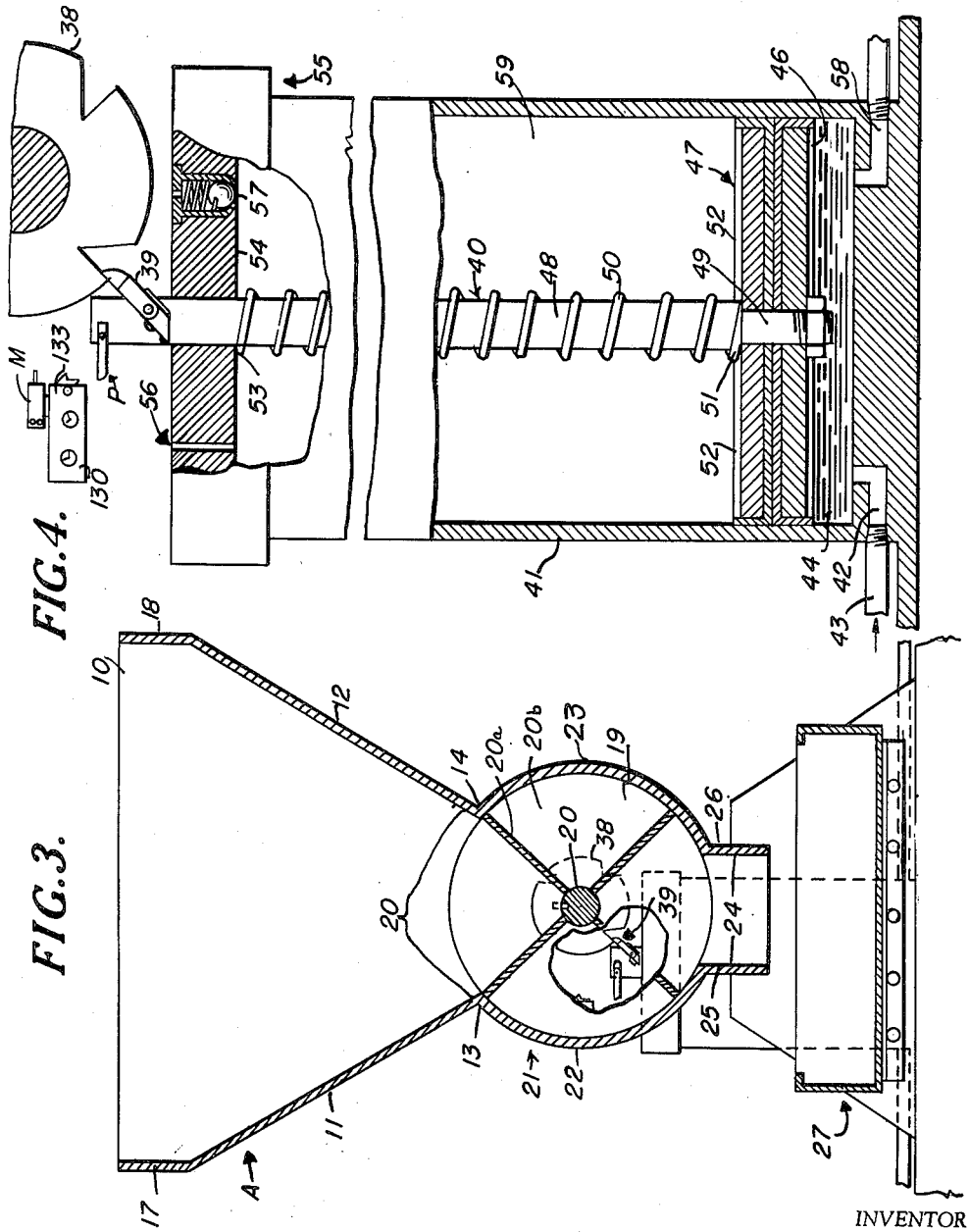

Feb. 26, 1957 W. E. WOLFE 2,782,760
AUTOMATIC POULTRY FEED AND WATER DISPENSER
Filed Jan. 13, 1955 3 Sheets-Sheet 3
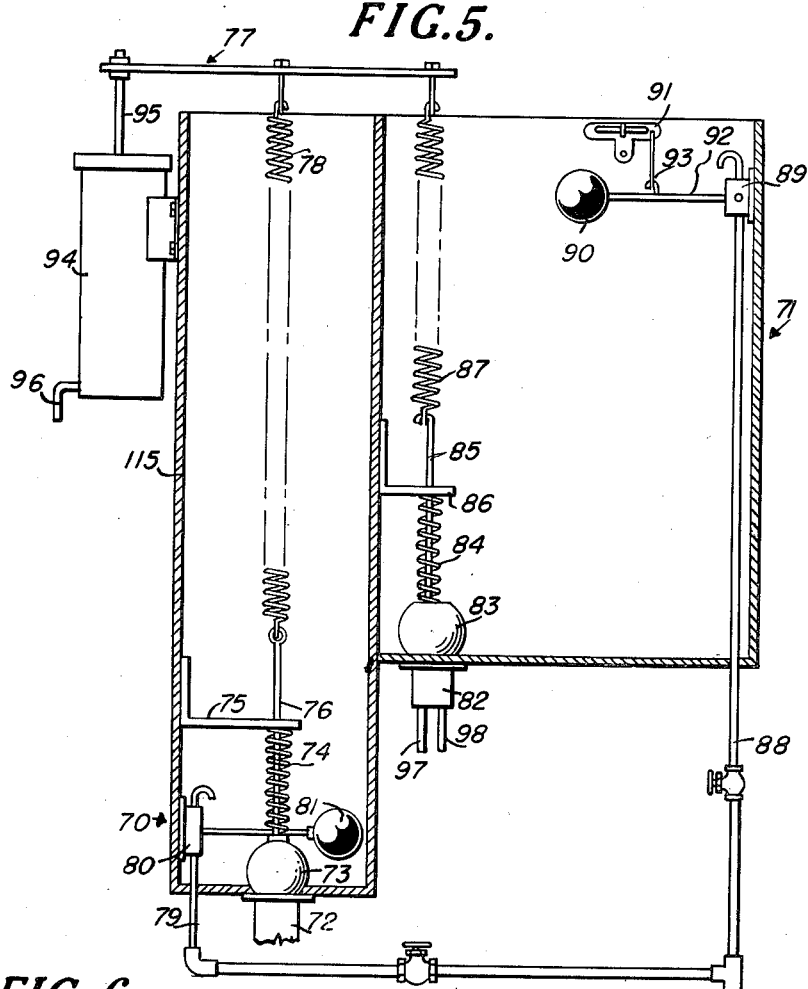
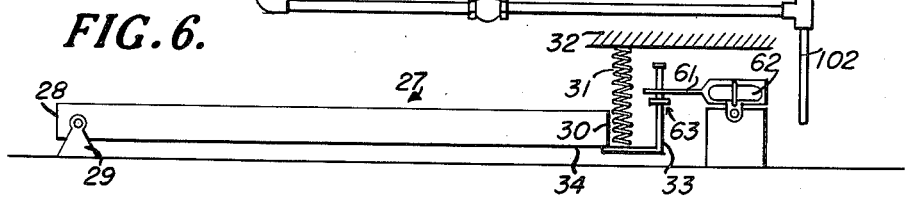
INVENTOR
WILLIAM E. WOLFE
BY *Cushman, Darby & Cushman*
ATTORNEYS

United States Patent Office 2,782,760
Patented Feb. 26, 1957

2,782,760

AUTOMATIC POULTRY FEED AND WATER DISPENSER

William E. Wolfe, Grottoes, Va.

Application January 13, 1955, Serial No. 481,558

5 Claims. (Cl. 119—51.5)

This invention relates to automatic poultry feed and water dispensers and, in particular, to such devices which include predetermined feed control varied to the rate of growth of the poultry being nourished. More specifically, this invention relates to improvements in the poultry feed and water dispensers disclosed and claimed in Patent No. 2,701,548, February 8, 1955.

As stated in Patent No. 2,701,548, in the breeding of poultry, many disease germs are found in and around the water trough, since it is inevitable that litter, filth and droppings will get into the water trough if the water is allowed to stand for long periods of time. Accordingly, it is desirable not only to keep the trough full of water, but also to provide that such trough will be emptied and flushed periodically to reduce the hazard of disease.

The natural tendency of poultry is to eat and then to drink. One thousand birds will consume approximately thirty pounds of feed per day at one week old and approximately two hundred and twenty pounds of feed when ten weeks old. In most instances, an automatic feeder as disclosed in Patent No. 2,701,548, would suffice to provide for automatically feeding the birds, yet compensating for varying demand for feed. However, in some instances, a more careful control of the amount of feed that is provided by my automatic feeder and water dispenser is necessary. For this purpose, I have devised an improved type of feed and water dispenser, as will be fully disclosed hereinafter.

In Patent No. 2,701,548, I also provided that the feed dispensing unit was controlled by the amount and weight of the feed in the trough. Again, I should note that, in most instances, this means of controlling the feed dispensing unit is quite satisfactory. However, birds are creatures of habit, and, being creatures of habit, can sometimes foil even the most carefully devised automatic units such as, in the present system, an automatic poultry feed and water dispenser. Accordingly, an additional improvement of my feed and water dispenser of Patent No. 2,701,548, is fully disclosed hereinafter, and concerns an anticipation of the problems that result when the birds being fed all flock to the feed trough at one particular time.

It is the primary object of the present invention to provide a combination poultry feed and water dispenser which is adapted to take advantage of the feed and drinking habits of the poultry so as to provide fresh, wholesome food according to their needs and to further provide clean fresh water automatically and responsive to the rate at which the feed is consumed.

It is another object of this invention to provide an automatic poultry feeder and water dispenser which is entirely automatic in dispensing stipulated amounts of feed, as well as water to a flock of poultry, and yet, is free from complicated electrical and mechanical devices with which the average poultry farmer is unfamiliar.

It is still another object of this invention to provide a poultry feeder which will automatically dispense a predetermined amount of feed into a feed trough when a substantially equivalent predetermined amount of feed has been removed from the trough, the said automatic dispensing of this feed causing an associated water trough to be automatically flushed and refilled with fresh water.

It is a further object of this invention to provide an automatic poultry feed and water dispenser which is adapted to dispense predetermined amounts of feed, such amounts being dependent on many variables reflecting changing feed consumption, such as age, temperature and disease.

It is an additional object of this invention to provide an automatic poultry feed and water dispenser adapted for dispensing a predetermined amount of feed, this feed being dispensed by means of a horizontally rotatable feed measuring means, said means comprising a horizontally rotatable axle having a number of paddle members spaced equi-distantly therearound and extending longitudinally thereof to define a number of V-shaped compartments.

Another important object of this invention is to provide an automatic poultry feed and water dispenser which is adapted for use with small flocks in which a series of these dispensers might be provided for separate flocks of different ages whereby each flock will receive the proper amount of feed corresponding to its age and feed requirements.

A further object of this invention is to provide an automatic poultry feed and water dispenser wherein control means are included for dispensing the feed at the required times and for safeguarding from the idiosyncrasies of the poultry being fed.

Other objects and advantages of the invention will be apparent during the course of the following description.

In the accompanying drawing, forming a part of this application, and in which like numerals are employed to designate like parts throughout the same, Figure 1 is a plan view of one aspect of the improvements showing my improved feed dispensing means, as well as the interrelation between the feed dispenser and the watering trough.

Figure 2 is a diagrammatic sketch of my improved wiring circuit employed in this invention to automatically coordinate the water trough with the feed dispenser and, in addition, to compensate for the idiosyncrasies of the poultry being nourished.

Figure 3 is an enlarged sectional elevation of the feed dispenser taken on the line 3—3 of Figure 1.

Figure 4 is an enlarged elevational view of one of the hydraulic cylinders employed to automatically operate the invention and control the amount of feed dispensed thereby. Parts are in section to disclose the interior details of the cylinder.

Figure 5 is an enlarged sectional elevation of the water trough and flushing tank used in the preferred embodiment of this invention taken on the line 5—5 of Figure 1; and Figure 6 is a side elevation of the feed trough used in my improved embodiment of the invention, showing how it is pivotally mounted on one end and spring supported on the opposite end so as to be capable of instituting a feed and water dispensing cycle upon the consumption of the charge of feed in the trough.

As stated in Patent No. 2,701,548, a preferred embodiment of this invention, as illustrated in the drawings, comprises four basic components, namely, (A) a combination feed dispenser and feed trough unit; (B) a combination water trough and water flushing tank unit; (C) a hydraulic system interconnecting and coordinating the water dispensing unit with the feed dispensing unit; and (D) the electrical circuit employed to automatically control and integrate the overall system.

For clarity of description, the above four units will be described separately in this order, followed by a general description of the interrelation of the separate units, as well as a specific description of the improvements therein as incorporated in this application.

*Combination feed dispenser and feed trough unit*

The feed dispenser A comprises a feed storage bin 10 (Figures 1 and 3) having inwardly directed side panels 11 and 12 (Figure 3) spaced apart at their lower edges 13 and 14, and vertically disposed end portions 15 and 16 integrally secured to the edges of said inwardly directed panels. The top portions 17 and 18 of said panels are extended vertically upward any desired height to provide ample feed storage space sufficient to operate the invention for any predetermined length of time.

A feed measuring and dispensing member 19 is rotatably positioned beneath the hopper. This member comprises an axle 20 having a number of paddles 20a which form compartments 20b spaced at equal intervals around the axle extending longitudinally from one end of the axle to the other end of sufficient width to mate with the space between the lower edges 13 and 14 of the side panels 11 and 12.

A housing 21 (Figure 3) comprising two substantially semi-cylindical portions 22 and 23 is adapted to house the feed measuring and dispensing member 19 for rotatable movement therein. This housing 21 extends the length of the member 19 and has its upper edge portions integrally secured to the adjacent lower edges 13 and 14 of the side panels. A feed discharge chute 24 comprising spaced lower portions 25 and 26 of housing 21 is provided so as to mate with respective compartments in the feed measuring and dispensing member 19.

A feed trough 27 (Figure 6) is positioned beneath the discharge chute 24 of the housing 21 so as to receive grain which is passed through this discharge opening. One end 28 of the said trough is pivotally mounted on a bracket 29, and the opposite end 30 is resiliently supported by a spring 31 attached at one end to the trough, and at the other end to any stationary surface 32. In my improved embodiment of the invention, an L-shaped switch arm 33 is integrally secured to the bottom 34 of the trough 27 and extends outwardly from the end 30 and upwardly for engagement with a mercury switch 62.

Feed dispenser member 19 has circular end portions 36 and 37 integrally secured to the opposite ends of the main body. A ratchet 38 (Figures 1 and 3) is secured concentric with one end 36 of the member 19 for meshed engagement with a ratchet pawl 39 (Figures 3 and 4), located in the upper portion of a piston rod 40 (Figure 4) adapted for reciprocal vertical movement in a hydraulic cylinder 41.

The hydraulic cylinder 41 (Figure 4) is adapted to receive a source of hydraulic pressure, such as water, through inlet port 42 to which a fitting 43 is threadedly secured, whereupon the chamber 44 intermediate to bottom 45 of the hydraulic cylinder 41 and the lower face 46 of the piston 47 is filled with fluid. The portion 48 of the piston rod 40 which is normally enclosed within the hydraulic cylinder is of smooth cylindrical configuration secured at its lower end 49 to the piston and having a spring 50 encircling the rod so as to bear at its lower end 51 on the upper surface 52 of the piston and at its upper end 53 against the lower surface 54 of the top hydraulic cylinder cap 55. The spring 50 is in its normal position, as shown, being neither under compression nor tension. A capillary tube 56 is provided in the cap of the hydraulic cylinder to permit the free passage of the air in and out of the cylinder and a spring-urged ball type air vent 57 is also secured in the cap of the hydraulic cylinder for rapid one-way movement of air outwardly from the interior of the hydraulic cylinder. A fluid discharge port 58 is provided in the base of the hydraulic cylinder for permitting the fluid to drain from the cylinder, under certain conditions, as will be set forth more fully hereinafter.

Thus, it may be seen from the above description of the elements comprising the feed dispenser, that water pressure connected to inlet port 42 of hydraulic cylinder 41 (Figure 4) will force piston 47 and the piston rod 40, secured thereto, upwardly, evacuating the air from the upper chamber 59 of the cylinder through capillary tube 56 and ball check air vent 57. Since the ratchet pawl 39 of the piston rod 40 is in engagement with the ratchet 38 secured to the feed dispensing member 19, upward vertical movement of the piston rod will cause the ratchet to rotate thereby revolving the feed dispensing member from the position shown in Figure 3, a predetermined angular displacement, thereby positioning in sequence one or more of the compartments 20b formed by paddles 20a over the feed discharge chute opening 24 of the housing.

It can be appreciated that the amount of upward vertical movement of the piston rod determines the angular displacement of the feed dispensing member, thereby determining the amount of feed discharge from the compartments 20b. Upon discharge of such predetermined amount of grain into the feed trough 27, spring 31 (Figure 6) is placed under tension thereby permitting the free end 30 of the trough to pivot downwardly. As the flock feeds, the quantity of grain in the trough is gradually lessened, allowing the spring 31 to rotate the free end 30 of the trough upwardly until the limit stop 63 engages limit switch arm 61 of mercury switch 62, the latter in turn closing an electrical circuit to be more fully described hereinafter. It should be preliminarily noted that the close of this switch 62 institutes a new feed and water dispensing cycle.

As stated above, the upward movement of the piston rod determines the amount of grain dispensed. This upward movement also directly controls the hydraulic system operating the apparatus. A pin P is located on the upper portion of the piston rod and is adapted to engage mercury switch M in the course of the upward movement of the piston rod. Engagement of pin P with mercury switch M opens the electrical circuit of the apparatus. The practical end result of opening this switch M is to shut off the source of water pressure entering inlet port 42 (Figure 4). When this source of pressure is cut off, spring 50 urges piston rod 47 downwardly, thereby forcing the water in the lower chamber 44 of the water cylinder out through outlet port 58. The upper chamber 59 is, as already noted, in constant contact with the atmosphere so that the piston will move freely downward when the water pressure is cut off.

The foregoing sequence in the hydraulic cylinder controlling the feed dispensing unit will not be repeated until a predetermined quantity of feed in the feed trough has been consumed. As noted heretofore, the practical effect of contact of limit stop 63 with limit switch arm 61 is to close an electrical circuit which will once again permit fluid pressure to enter port 42 of hydraulic cylinder 41 thereby repeating the feed dispensing cycle.

It can be appreciated that the improvements embodied in this application are quite evident in the feed dispensing cycle. As stated heretofore, my novel feed dispensing member 19 provides for the dispensing of measured amounts of feed on an automatic basis. These amounts of feed can be varied as the poultry grows older, thus, providing for rigid control of diet.

In addition, the feed dispensing system described above provides the improvement comprising the utilization of a switch means for terminating the feed and water dispensing cycle, which is associated with the upward movement of the hydraulic cylinder of the feed dispensing means. This improved terminating means anticipates the possibility that the poultry being fed would congregate on the feed trough at certain times through habit, which would result in malfunction of my invention by premature opening of switch 62 if the cycle terminating means was dependent on downward movement of the trough as is the case in Patent No. 2,701,548. Of course, it should be noted that the means of terminating the feed and water dispensing cycle utilized in Patent No. 2,701,548, is operable in most instances and the above described improvement is primarily designed to obviate the difficulties encountered under other than ordinary circumstances.

*Water dispensing unit*

A water dispensing unit (Figures 1 and 5) is integrated with the operation of the feed dispensing unit and comprises a water trough 70 and a water trough flushing tank 71 (Figure 5). The water trough is fitted with a drain 72 and a drain stopper 73 which is positively seated therein by means of a spring 74 positioned between the top of the stopper and the bottom face of angle bracket 75. Stopper connecting rod 76 is secured to a lifting arm 77 by means of a resilient connection 78. Water is admitted into the trough through pipe line 79 and valve 80, controlled by valve float 81 which automatically shuts off the supply of water at a predetermined level.

Water trough flush tank 71 is likewise provided with a drain 82 and a positively seated stopper 83 spring urged against the drain seat by means of spring 84 positioned about stopper connecting rod 85 intermediate the top portion of stopper 83 and the bottom face of angle iron bracket 86. Stopper connecting rod 85 is resiliently secured to lifting arm 77 by means of spring 87. Water is supplied to the tank by means of pipe line 88 passing through valve 89, which is operated by float 90 which automatically closes the valve when a predetermined level in the tank has been reached. A mercury switch 91 is secured to the upper portion of the tank and is connected to float arm 92 by means of connecting link 93 whereupon the gradual downwardly pivotal movement of float arm 92 will rotate mercury switch 91 and open the electrical control circuit. The circuit will remain open until the tank has once again filled to the predetermined level, whereupon the float arm 92 will be pivoted upwardly, causing the connecting link 93 to reverse the position of the mercury switch, thereby re-closing the circuit.

A water cylinder 94, similar in operation and structure to the water cylinder illustrated in Figure 4 and described above, is secured to the extended side 115 of water trough 70, whereby piston connecting rod 95 is adapted to engage one end of lifting rod 77. Thus, it may be seen that if the source of water pressure is admitted through pipe line 96 into water cylinder 94, piston rod 95 will be caused to move upwardly, thereby lifting horizontally disposed lifting arm 77 vertically and simultaneously removing stoppers 73 and 83 from their respective drains 72 and 82.

When the drains are opened, the water in trough 70 empties immediately down drain 72 and water from the water tank 71 enters drain 82 which is divided into trough flushing lines 97 and 98. Water from the tank courses equally through lines 97 and 98 (Figure 1) and enters the water trough at opposite ends 99 and 100, thereby vigorously flushing all accumulated matter in the bottom of the trough inwardly toward the center of the trough and out through the trough drain 72. When the water has lowered sufficiently to allow float arm 92 to pivot downwardly, mercury switch 91 is caused to rock clockwise, opening the control circuit a second time in series with trough switch 62. The water in water cylinder 94 then drains back out through the same line 96 in which it entered, allowing the piston rod to move downwardly and the drain stoppers to once again re-seat in their respective drains. Floats 81 and 90 open valves 80 and 89 respectively, allowing water from an independent source of supply from that of the water cylinder to once again enter the trough and the water tank. Once the trough and tank are refilled, mercury switch 91 is rotated counterclockwise, closing the electrical circuit and thereby readying this unit for another cycle of operation.

In connection with mercury switch 91, it can be appreciated that the electrical control circuit cannot be ready for the next cycle until the flushing tank is refilled. Thus, the flushing tank may be used as a type of water time clock by setting the water tank refill valve to refill at any specified time. In other words, an auxiliary means of control is provided whereby it is conceivable that the water refill valve would be set so that the time of refill was longer than the time required for the poultry to consume the feed. Accordingly, the consumption of the feed would not institute a new dispensing cycle as is normally the case, but, rather, the refilling of the flush tank, accompanied by the closing of switch 91, would be the controlling feature for the beginning of the new cycle.

*The hydraulic system*

Both the feed dispensing unit and the water dispensing unit are operated by the same source of water pressure and are thereby interlocked and integrated so that one will not operate without the other and accordingly when the one unit does operate the other will also function. Ordinarily, the timing of this system is such that the feed dispenser will first function and control the operation of the hydraulic system until the water dispensing unit is brought into operation, whereupon the water dispensing unit takes over control from the feed dispensing unit until the water trough flushing tank has been emptied and refilled. The refilling of the water trough flushing tank completes the cycle and returns the control to the feed dispensing unit. Of course, as noted in the previous paragraph, control can conceivably be retained by the water dispensing unit if the time of refill is sufficiently lengthy.

Referring once again to Figure 1 a source of water pressure is made available through pipe line 101, of which one branch 102 goes directly to the water trough and water trough flushing tank and is controlled completely and independently by the combination valves and floats secured thereto as aforesaid. Thus, the supply of water in these two water containers is independent of the remaining elements of the system and is controlled solely by the operation of the float-actuated valves 80 and 89. The second branch 103 of the source of water supply is piped directly to water cylinder 41 but with a solenoid-operated water valve 104 disposed intermediate the source of supply 101 and the water cylinder 41. A by-pass 105 is also provided around the solenoid-operated water valve and a hand-operated valve 106 is fitted into this by-pass. Thus, the water passes into the inlet port 42 of the water cylinder and when the water cylinder is full the surplus or overflow passes through the outlet port 58 (Figure 4) and through pipe line 96 into water cylinder 94. When limit switch 62 (Figure 6) is closed by the upward movement of stop 63 an electrical circuit is completed which actuates solenoid 107 (Figures 1 and 2) causing the valve 104 to open, thus starting the automatic cycle of operation of the combination feed and water dispenser.

As noted heretofore, the piston rod 40 of hydraulic cylinder 41 moves upwardly operating ratchet 38 causing feed to be discharged into the feed trough 27. The surplus of water from hydraulic cylinder 41 passes out through the outlet port 58 into hydraulic cylinder 94, piston rod 95 is forced upwardly thereby causing lifting arm 77 to unseat stoppers 73 and 83 from drains 72 and 82, as stated above. In order to insure that the water trough may have ample time to drain and be thoroughly flushed, lifting arm 77 is allowed to return slowly to its normal position of rest as piston rod 95, secured to the piston in the water cylinder 94, moves vertically downwardly as water in the water cylinder is slowly forced back through pipe line 96 for discharge through capillary tube 110, which is the common discharge outlet for both hydraulic cylinders 41 and 94. Thus, hydraulic cylinders are energized in sequence but, for all practical purposes, both cylinders are energized at approximately the same time. The common capillary tube 110 operates to meter the used water through its open end for convenient disposal.

By allowing the pistons in both water cylinders to slowly return to their normal positions of rest in the bottom of the cylinders, two important advantages are obtained: (1) the feed dispensing cylinder is allowed to return slowly and silently to its position whereby the flock is not frightened by sudden movements or unexpected noises and (2) the stoppers in water trough 70 and water tank 71 are not re-seated until sufficient time has elapsed to enable the water trough to be thoroughly flushed.

Electrical circuit

The electrical circuit per se is diagrammatically shown in Figure 2 wherein a master clock 120 exercises overall control of the electrical system which is integrated with and dominates the hydraulic circuit of the invention. A source of electrical energy 121 is available to the clock which may be adjusted and set to meter electrical energy to the electrical circuit only during such predetermined periods of day as it is desired that feed and water be supplied to the flock. When the master clock closes the overall circuit, a series of lights 122 connected in parallel and secured along the lower edges of the feed bin (Figure 1), are lighted to attract the attention of the birds and provide illumination while they are feeding. Normally open mercury limit switch 62 is operated as aforesaid by the pivotal movement of the feed trough and operates to institute the feed and water dispensing cycle, when the feed trough ascends a predetermined distance, normally, when the feed trough is empty of feed. Upon the closing of limit switch 62, a relay holding coil H is energized, thus, closing ganged relay switches J and K. The closing of these switches J and K energizes solenoid 107 to operate the solenoid controlled valve 104 placed in the pipe line 103 intermediate the source of water supply 101 and the hydraulic cylinder 41. In addition, the closing of these switches J and K results in the control of the electrical circuit being passed from switches 91 and 62 to normally closed mercury switch M. As can be appreciated, both the relay holding coil H and the solenoid 107 will remain energized so long as switch M is closed. As described heretofore, the length of time during which switch M remains closed is dependent upon the position of pin P on the piston rod 40. Thus, one of the improvements of this application is clearly presented in that solenoid 107 remains energized until switch M is open by the action of the hydraulic cylinder 41 regardless of the movements of the flock around feed trough 27.

Normally closed mercury switch 91, which is in series with normally open limit switch 62, is pivotally mounted in the upper portion of the water trough flush tank and when the solenoid 107 opens the solenoid operated valve 104, water pressure is admitted to water cylinder 94. Stopper 83 is lifted from its seat over the drain 82 in the tank 71 thereby allowing float 90 to pivot downwardly and open mercury switch 91, thus suspending the operation of another cycle until the water tank and trough have had a chance to refill. The operation of this switch 91 can be in the nature of a water time clock, as noted heretofore, since, conceivably, the length of time for this switch to be closed can be set greater than the length of time required to pivot the feed trough. Thus, since switches 91 and 62 are in series, the institution of a new feed and water dispensing cycle would be delayed until switch 91 was closed, despite closure of switch 62 by the elevation of feed trough 27.

Operation

From the above explanation of the various aspects of this invention, it will be readily apparent that an automatic combination poultry feed and water dispenser is provided having improved features and yet utilizing simple electrical and hydraulic circuits which most unskilled persons can understand and maintain in operating condition.

In operation, each compartment of the feed dispensing member may be divided into as many sub-compartments as desired for storing the different feed mixes required for a balanced diet. This feed dispensing member is preferably constructed of sheet metal and completely enclosed so as to be rat and vermin proof. Once the feed dispensing member is filled and the hydraulic circuit is tapped into a source of water supply, the master clock can then be set to establish the periods during which the system will operate. Normally, the system is inoperable only at night.

After the birds have consumed a predetermined quantity of feed, spring 31 will urge the free end of feed trough 27 upwardly, thereby closing mercury switch 62 which will in turn energize relay holding coil H. By energizing relay holding coil H, ganged relay switches J and K are closed, thus, energizing solenoid 107 and opening solenoid-controlled valve 104 to admit water pressure into the hydraulic system.

The pistons in both cylinders are forced upwardly whereby grain is dispensed from the storage bins and the water in the water trough is drained and flushed. Solenoid 107 remains energized until switch M is opened by the action of pin P on piston rod 40.

After the solenoid 107 is de-energized, the system is being restored to its original position in readiness for another cycle. The water trough flush tank is being refilled and both hydraulic cylinders are slowly returning to their original positions. When the water trough flush tank has become refilled, mercury switch 91 is again closed. In addition, the lowering of piston rod 40 again closes mercury switch M. The system is then prepared to operate through another cycle when the feed has reached the aforementioned predetermined level in the feed trough thereby once again closing mercury switch 62.

Thus, in essence, the entire system is responsive to a predetermined amount of feed in the feed trough, yet is improved to such an extent as to insure against malfunction through the idiosyncrasies of the birds being fed and watered. As noted heretofore, a particular idiosyncrasy involved the fact that some young birds in the past have learned that the hum of solenoid valve coil 104 meant fresh feed. The birds then immediately flocked to their respective feeding places, thus causing a premature lowering of the spring suspended feed trough. Accordingly, if the termination of the cycle depended upon the position of the feed trough as in Patent No. 2,701,548, then, in these instances, malfunction of the apparatus would occur. This has been coped with by the provision of pin P, mercury switch M, relay holding coil H and ganged relay switches J and K.

Because this unit is relatively small and compact, it is ideally suited for separating flocks of different age groups and feeding these flocks separately in different sections of the brooding shed.

It is, of course, apparent from examination of Figure 1 that, should electric power fail, the system can be operated manually by the use of the by-pass 105 and operation of valve 106 by hand.

In connection with the rigid control of the amount of feed dispensed, which is afforded by my improved feed dispensing member, it should be noted that the length of the stroke of the piston rod 40 can be varied. Variation of the length of this stroke accompanied by, of course, coincidental adjustment of the pin P enables the poultry raiser to vary the amount of feed from a mere trickle for baby chicks, up to the amount that more than one hundred chicks will consume per feeder at ten weeks of age. The poultry raiser, thus, has complete control through all ranges of feed demand by a simple adjustment of the length of cylinder stroke and time of actuation of the mercury switch M.

The hydraulic system works equally well whether the pressure is obtained from a source such as a local storage tank or portable tank car or whether it is tapped directly into a permanent water system, such as a municipal water main.

A counter 130 may be attached to the apparatus to record the number of units of feed charged into the feed trough 27 during any given period. The pin P which actuates switch M may also be employed to engage star wheel 133 of the counter each time a unit of feed is charged into the feed trough.

It should be stressed that the control arrangement constituting one aspect of the improvements set forth in this application is particularly adapted to the apparatus of Patent No. 2,701,548, in the use of water pressure, but it is generally applicable to analogous feeders where, for example, an electric motor would be used in place of the hydraulic system. Of course, the electric motor circuit would be substituted for the solenoid valve coil 107.

The novel principles of this invention are broader than the specific embodiments recited above and rather than unduly extend this disclosure by attempting to list all the numerous modifications that have been conceived and reduced to practice during the course of this development, these novel features are defined in the following claims.

I claim:

1. An automatic poultry feed and water dispenser comprising a feed trough supported at one end by pivotal means and at the other end by resilient means, feed dispensing means discharging into said feed trough, said feed dispensing means including a feed storage bin having downwardly converging sides spaced apart at their lower edges and positioned above said feed trough, horizontally rotatable feed measuring means positioned intermediate said bin and said feed trough, a hydraulic cylinder comprising a piston and piston rod slidably secured therein operatively engaged to said feed measuring means, means responsive to the weight of feed in said feed trough to actuate said hydraulic cylinder, a water trough adjacent said feed trough, means for flushing and refilling said water trough, and means responsive to the actuation of said hydraulic cylinder to actuate said flushing and refilling means, said horizontally rotatable feed measuring means comprising a horizontally rotatable axle having a number of paddle members spaced equidistantly therearound and extending longitudinally thereof to define a number of V-shaped compartments, the edges of said compartments being adapted to mate with the said lower edges of said feed bin converging sides.

2. Apparatus as defined in claim 1 wherein said piston rod includes a ratchet pawl mounted in its outer free end, and including a ratchet integrally secured to an end of said feed measuring means, said ratchet being disposed in meshing engagement with said ratchet pawl, whereby upward actuation of said hydraulic cylinder will effect upward axial movement of said piston rod and accompanying rotation of said feed measuring means but reciprocal downward axial movement of said piston rod will cause slippage of said ratchet pawl on said ratchet with no accompanying rotation of said feed measuring means.

3. Apparatus as defined in claim 1 wherein said means for actuating said hydraulic cylinder includes a normally open first electric switch, means secured to the resiliently supported end of said feed trough carrying a limit stop, said limit stop being adapted to engage and close said first switch when said trough is caused to pivot upwardly a predetermined distance by said resilient support as the grain in said trough is consumed, a conduit connected to said hydraulic cylinder, an electrically actuated valve in said conduit, an electrical circuit including said first switch and said valve, means for electrically energizing said circuit whereby said valve is opened when said limit stop is closed, and means for maintaining the energization of said circuit until said piston rod travels upwardly a predetermined distance.

4. Apparatus as defined in claim 3 wherein said means for maintaining the energization of said circuit includes a normally closed second electric switch, a limit pin mounted on said piston rod adapted to engage and open said second switch when said piston rod moves upwardly a predetermined distance, a relay holding coil adapted to be energized upon the closing of said first switch and de-energized upon the opening of said second switch, at least one ganged relay switch adapted to close upon the energization of said relay holding coil and maintain energization of said circuit until said relay holding coil is de-energized.

5. An electro-mechanical automatic poultry feed and water dispenser comprising a feed trough pivotally mounted at one end and resiliently mounted at the opposite end thereof, a first electric switch disposed adjacent the resiliently mounted end of said feed trough in such a manner as to be closed by upward pivotal movement of said trough, a feed bin positioned above said feed trough, feed charging means comprising a rotatable axle having a number of longitudinally extending paddle members therearound associated with said feed bin, a first hydraulic cylinder and piston, a second electric switch adapted to open upon upward movement of said piston, a relay holding coil adapted to be energized upon the closing of said first electric switch and de-energized upon the opening of said second electric switch, a pair of ganged relay switches which close upon the energization of said relay holding coil and open upon de-energization thereof, a ratchet and pawl means engaging said first hydraulic cylinder piston to said feed charging means, a conduit connected at one end to a source of fluid pressure and at its opposite end to said first hydraulic cylinder, an electrically actuated valve in said conduit, said electrically actuated valve being in electrical series connection with said first electric switch and said ganged relay switches, a water trough adjacent said feed trough, a flushing tank positioned above said water trough, drains in the bottom of said water trough and said flushing tank, a stopper in each of said drains, flushing conduits connecting said flushing tank drain to said water trough, a conduit connected to a source of water and to said water trough and said flushing tank, a float-controlled valve in said water trough adapted to control the flow of water through said conduit means into said water trough, a float secured to said water trough valve, a float-controlled valve in said flushing tank adapted to control the flow of water through said conduit into said flushing tank, a float secured to said flushing tank valve, a third electric switch mounted on said flushing tank adapted to be opened by downward movement of the float therein, said third switch being in electrical series connection with said first switch and said electrically actuated valve, a second hydraulic cylinder and piston connected by fluid conduit to said first hydraulic cylinder, a capillary tube discharge outlet in said float conduit connecting said hydraulic cylinders, means connecting said second hydraulic cylinder piston to said water trough stopper and to said flushing tank stopper whereby movement of said hydraulic cylinder piston may simultaneously lift both stoppers from their respective drains, said hydraulic cylinders acting simultaneously in response to fluid pressure when said electrically actuated valve is opened by closing of said first switch.

References Cited in the file of this patent

UNITED STATES PATENTS

| | | |
|---|---|---|
| 1,572,981 | Addrich et al. | Feb. 16, 1926 |
| 2,701,548 | Wolfe | Feb. 8, 1955 |